(12) United States Patent
Larzul et al.

(10) Patent No.: US 9,271,600 B2
(45) Date of Patent: Mar. 1, 2016

(54) ERGONOMIC CAPSULE EXTRACTION DEVICE

(75) Inventors: David Larzul, Meyzieu (FR); Patrick Baudet, Meyzieu (FR); Alain Jaccard, Ste-Croix (CH); Blaise Rithener, La Tour-de-Peilu (CH)

(73) Assignee: Nestec S.A., Vevey (CH)

( * ) Notice: Subject to any disclaimer, the term of this patent is extended or adjusted under 35 U.S.C. 154(b) by 568 days.

(21) Appl. No.: 13/500,393

(22) PCT Filed: Oct. 5, 2010

(86) PCT No.: PCT/EP2010/064773
§ 371 (c)(1),
(2), (4) Date: May 23, 2012

(87) PCT Pub. No.: WO2011/042401
PCT Pub. Date: Apr. 14, 2011

(65) Prior Publication Data
US 2013/0047863 A1    Feb. 28, 2013

(30) Foreign Application Priority Data

Oct. 5, 2009    (EP) .................................... 09172187
Oct. 21, 2009    (EP) .................................... 09173600

(51) Int. Cl.
*A47J 31/40*    (2006.01)
*A47J 31/36*    (2006.01)

(52) U.S. Cl.
CPC .................................. *A47J 31/3633* (2013.01)

(58) Field of Classification Search
CPC ....... A47J 31/40; A47J 31/44; A47J 31/4471; A47J 31/46

USPC ..................... 99/289 R, 295, 302 P; 426/433
See application file for complete search history.

(56) References Cited

U.S. PATENT DOCUMENTS 7,444,927 B1 * 11/2008 Crosville et al. ................. 99/295
2005/0129809 A1 * 6/2005 Cortese ............................ 426/77

(Continued)

FOREIGN PATENT DOCUMENTS

CN    200987586    12/2007
EP    1980183 A2    10/2008

(Continued)

OTHER PUBLICATIONS

Written Opinion and International Search Report mailed Apr. 15, 2011 for corresponding Intl. Appln. No. PCT/EP2010/064773.

(Continued)

*Primary Examiner* — Brian Jennison
(74) *Attorney, Agent, or Firm* — K&L Gates LLP

(57) ABSTRACT

A device (1) for receiving an ingredient cartridge (2) and extracting the ingredient by passing heated liquid through the cartridge, comprises: a cartridge seat (10) that has an open configuration for receiving and/or removing a cartridge from such device and a closed configuration for extracting the ingredient; and a force generation means (46) for assisting a closure or opening movement of the cartridge seat. The force generation means can be associated with a dampening means (47, 48) for dampening the closure or opening movement of the cartridge seat when assisted by the force generating means. The device can have a user-movable handle (41) that is associated with an end-of-stroke feed-back means (50) for providing a corresponding feed-back to a user actuating the handle.

5 Claims, 5 Drawing Sheets

(56) References Cited

U.S. PATENT DOCUMENTS

2007/0221066 A1     9/2007   Sullivan et al.
2009/0308258 A1*   12/2009   Boussemart et al. ........... 99/295

FOREIGN PATENT DOCUMENTS

| | | |
|---|---|---|
| JP | 0814867 | 2/1996 |
| JP | 09119492 | 5/1997 |
| JP | 09506799 | 7/1997 |
| JP | 2006143146 | 6/2006 |
| JP | 2010528751 | 8/2010 |
| WO | 2007111884 | 10/2007 |
| WO | 2007/135136 A1 | 11/2007 |
| WO | 2008/004116 A1 | 1/2008 |

OTHER PUBLICATIONS

Chinese Office Action for Application No. 201080054869.4, Dated Oct. 10, 2014, 11 pages.

Japan Office Action for Application No. P2012-531457 dated Jul. 29, 2014, 10 pages.

* cited by examiner

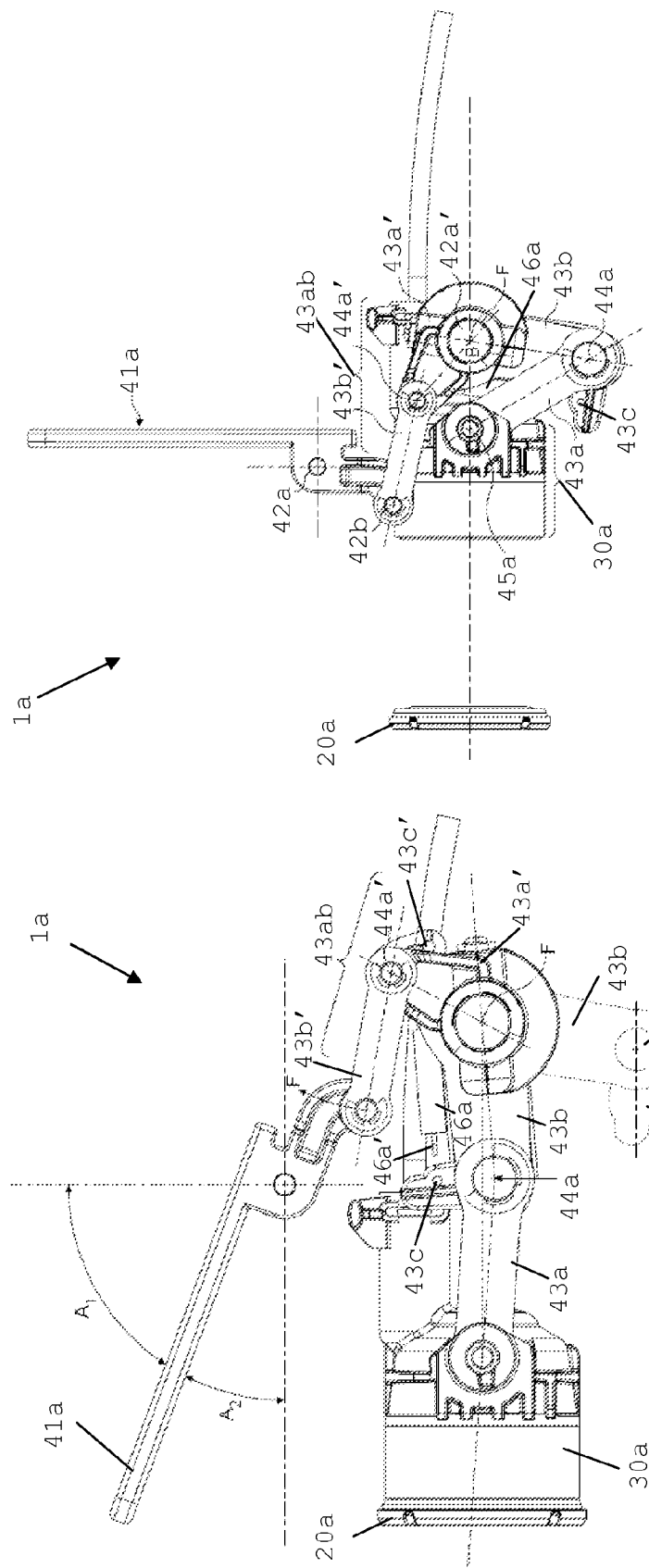

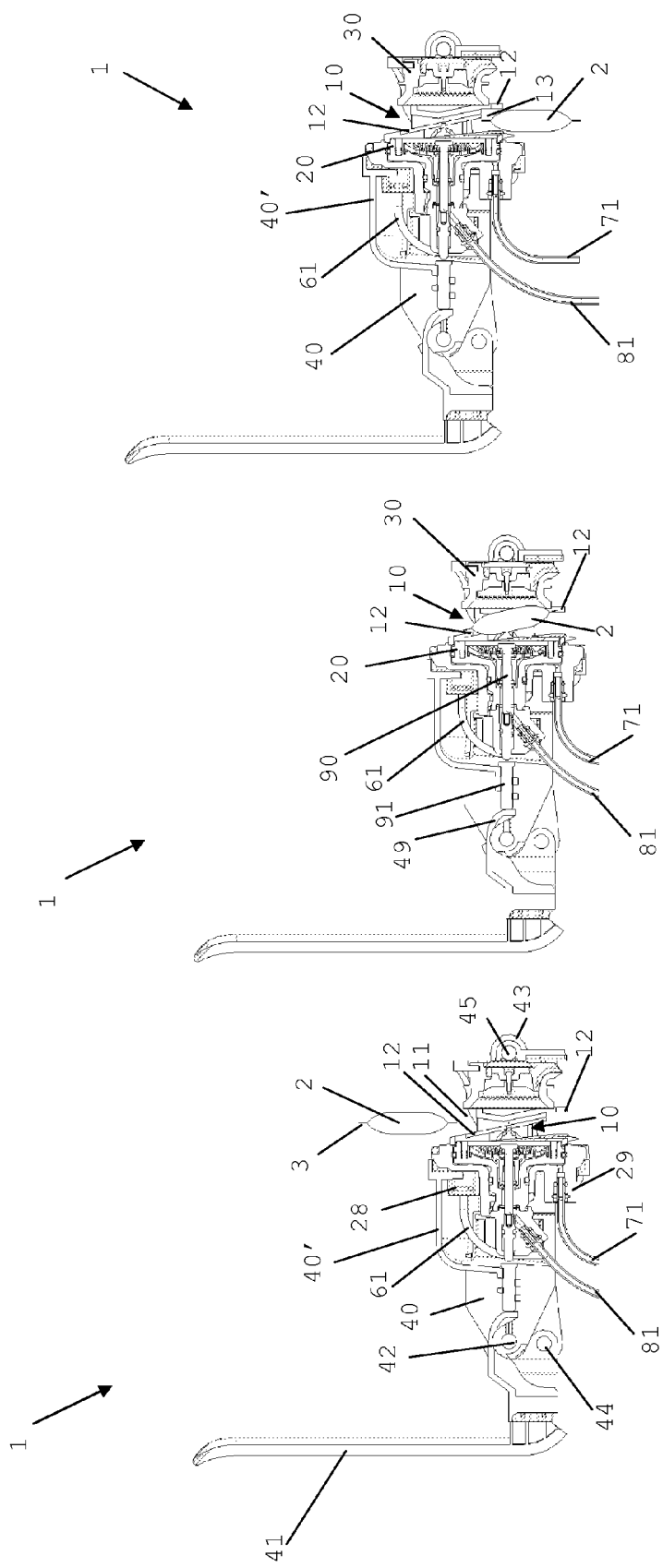

ERGONOMIC CAPSULE EXTRACTION DEVICE

CROSS REFERENCE TO RELATED APPLICATIONS

The present application is a National Stage of International Application No. PCT/EP2010/064773, filed on Oct. 5, 2010, which claims priority to European Patent Application No. 09172187.8, filed on Oct. 5, 2009, and European Patent Application No. 09173600.9, filed on Oct. 21, 2009, the entire contents of which are being incorporated herein by reference.

FIELD OF THE INVENTION

The present invention relates to a cartridge extraction device, in particular for a beverage preparation machines. The cartridge device can have an ergonomic manual handling arrangement to open and close the device for introducing and removing cartridges.

For the purpose of the present description, a "beverage" is meant to include any liquid food, such as tea, coffee, hot or cold chocolate, milk, soup, baby food, etc. . . . Cartridges designate any enclosure for containing a pre-portioned ingredient whether rigid, such as capsules, or soft or flexible, such as pods, and made of any material, recyclable or non recyclable, biodegradable or non-biodegradable, such as aluminium or plastic, in particular aluminium pods or aluminium capsules.

BACKGROUND ART

A problem encountered with the handling of ingredient cartridges is the positioning of the cartridges in an extraction device and the closing of the latter around the cartridge to perform the extraction process. The cartridge usually has to be positioned by the user on a cartridge support or in a housing, then the device is closed manually or automatically around the cartridge.

It is important to correctly position the cartridge so that the device closes properly around the latter and to form a good seal to ensure good conditions of extraction. Bad positioning may damage the cartridge, and thus affect the conditions of extraction.

For the sealing of the device around the cartridge to permit proper extraction by passing a pressurized liquid through the cartridge without undesired leakage, the closing of the device around the cartridge must be carried out with a high level of precision. The closing distance of the mechanical closing arrangements of such devices are usually manually adjusted during the manufacturing process of the device to achieve the required level of precision.

The loading of the capsule must also be easy, without trial and error as to the correct position of the capsule in the device. The loading must also be as rapid as possible and not require excessive manipulations.

WO 2005/004683 relates to a capsule brewing device comprising: a first part; a second part that can be moved relative to the first part; a housing for the capsule and defining, in a closed position of the movable part against the fixed part, an extraction position of the capsule along an axis in said housing; an insertion and positioning part comprising means for guiding the capsule arranged so as to insert the capsule by gravity and position said capsule in an intermediate position; a drink pouring system; and the second movable part is so arranged and constructed to move the capsule from the intermediate position into the extraction position when the device is closed.

EP 1 721 553 discloses a brewing unit for coffee machines using capsules. The unit has a front part with a beverage outlet and a rear part with a hot water inlet. The front part and the rear part are mounted in-between a pair of facing shoulder guide members. The front part is movable in-between these guide members to be urged against the rear part so as to form with the rear part a brewing chamber for accommodating a capsule to be extracted, whereby an unoccupied volume is left in front of the front member between the guide members within the machine.

EP 1 659 547 relates to a beverage machine for making infusions, in particular, espresso coffee. The machine includes an infusion chamber within a brewing unit that has a movable front part with a return spring and a beverage outlet duct that extends through the assembly's outer housing. The movable front part cooperates with a rear part that is movable within the housing and that can be pushed against the movable front part to compress the return spring whereby the outlet duct slides through the assembly's outer housing. The pod is passed through the external housing to the infusion chamber via a rigid pod feed channel and then the pod is transferred into the infusion chamber by an external bushing on the movable rear part of the brewing unit which is provided with a cam-like path for moving the rear part. This arrangement involves several problems. The pod must be moved during the closure of the brewing chamber and this can cause blocking and it also makes the retaining means of the pod more complex. Moreover, opening and closing the brewing chamber involves simultaneously a linear displacement of the movable rear part within the housing, of the movable front part within the housing and of the outlet duct through the housing which increases the risk of hyper-guiding and jamming or improper alignment of the various parts that linearly move one relative to another. The fluid system comprises a moving assembly which makes the fluid system more complex to assemble. When upon extraction brewing unit is re-opened for removing the pod, pressurized water contained within the infusion chamber may project outside the housing. Furthermore, an unoccupied volume is left within the machine between the front member and the casing when the outlet duct is in its retracted position.

U.S. Pat. No. 3,260,190 and WO 2005/072574 disclose a coffee machine having a removable drawer for positioning a coffee can therein. The drawer can be slid horizontally into the coffee machine and lifted towards a water injection arrangement. WO 2006/023309 discloses a coffee machine with a slidable drawer for the introduction of a coffee cartridge into the machine. The drawer is movable between an open and a closed position and has two cartridge half-shells that are pivotable against each other to form a brewing chamber when the drawer is in the closed position and pivotable apart when the drawer is slid out from the machine. U.S. Pat. No. 6,966,251 discloses a coffee machine having a horizontally slidable drawer for positioning a capsule therein. When slid into the machine, the drawer can be moved upwards towards a fixed capsule cage for form a brewing chamber for a capsule. EP 1 566 126 discloses a coffee machine with a vertical brewing unit for accommodating coffee pods. The brewing unit has a fixed upper part and a movable lower part for holding a pod and that can be pulled up for closing the brewing unit and let down for inserting or removing a pod.

Further brewing units are disclosed in EP 0 730 425, EP 0 862 882, EP 1 219 217, EP 1 480 540, EP 1 635 680, EP 1 669 011, EP 1 774 878, EP 1 776 026, EP 1 893 064, FR 2 424 010, U.S. Pat. No. 3,260,190, U.S. Pat. No. 4,760,774, U.S. Pat. No. 5,531,152, U.S. Pat. No. 6,904,840, U.S. Pat. No. 7,131,369, US 2005/0106288, US 2006/0102008, WO 2005/002405, WO 2005/016093, WO 2006/005756, WO 2006/066626 and WO 2007/135136.

Advanced brewing units, such as brewing units disclosed in WO 2005/004683, WO 2007/135135 and WO 2007/135136 have: a first part; a second part that can be moved relative to the first part; a housing for the capsule and defining, in a closed position of the movable part against the fixed part, an extraction position of the capsule along an axis in said housing; an insertion and positioning part comprising means for guiding the capsule arranged so as to insert the capsule by gravity and position said capsule in an intermediate position; a drink pouring system; and the second movable part is so arranged and constructed to move the capsule from the intermediate position into the extraction position when the device is closed. The movable part is driven by a handle to open and close the brewing unit.

In WO 2007/135135, the manual force required on the handle during the closing movement progressively increases up to an intermediate point of the closing distance to then progressively decrease from the intermediate point to the end point of the closing movement, the intermediate point forming an intermediate "hard point" along the closing movement. Moreover, to assist reopening of the brewing unit, a spring may be provided that is stressed during the closing movement and that relaxes during the opening movement, as for instance illustrated in WO 2007/135136.

EP 1 980 183 discloses an infusion unit for ingredient capsules. The unit has a first part defining an infusion chamber that holds the capsule and that is pivotable for evacuating the capsule upon infusion. Moreover, the unit has a second part movable in translation against and from the first part for closing and opening, respectively, the chamber. The second part is driven by a lever bearing a thrust cam that pushes the second part via an anti-friction bearing against the first part. An automatic-return mechanism with compression springs urges the second part via the bearing against the thrust cam on moving the second part away from the first part, i.e. on reopening the infusion unit. These springs are compressed on driving the second part against the first part and expand when the second part is allowed to move from the first part. In one embodiment, the bearing and the movable second part are connected by a wear-compensation compression spring that takes up automatically any play resulting from the wear of the thrust cam against the anti-friction bearing, probably to adjust automatically the closing distance of the second part against the first part. All disclosed springs, i.e. the automatic-return springs and the wear-compensation spring, work in compression and relaxation in the same direction in the same opening or closing sequence to mechanically restitute or accumulate respectively elastic energy.

SUMMARY OF THE INVENTION

The present invention relates to a device for receiving an ingredient cartridge and extracting the ingredient by passing heated liquid through the cartridge. The device comprises: a cartridge seat that has an open configuration for receiving and/or removing a cartridge from such device and a closed configuration for extracting the ingredient; and a force generation means for assisting a closure or opening movement of the cartridge seat.

Typically, this device is comprised in a beverage preparation machine for receiving ingredient cartridges such as capsules and/or pods. For instance, the machine is a coffee, tea, chocolate or soup preparation machine. In particular, the machine is arranged for preparing within the cartridge seat a beverage by passing hot water or another liquid through a cartridge containing an ingredient of the beverage to be prepared, such as ground coffee or tea or chocolate or cacao or milk powder.

For example, the preparation machine comprises: a beverage preparation unit arranged to receive cartridges for use and evacuate cartridges upon use, e.g. an extraction device; a housing having an opening leading into an area to which cartridges are evacuated from the preparation unit; and a receptacle having a cavity forming a storage space for collecting cartridges evacuated to such an area into the receptacle to a level of fill. The receptacle is insertable into the area for collecting used cartridges and is removable from this area for emptying the collected cartridges. Examples of such machines are disclosed in WO 2009/074550 and in WO 2009/130099.

In accordance with the invention, the force generation means is associated with a dampening means for dampening the closure or opening movement of the cartridge seat when assisted by the force generating means. The dampening means may comprise at least one of an inertia dampener, a friction dampener, a hydraulic dampener, an air dampener and a magnetic dampener. For example, the dampening means comprises an inertia and/or friction dampener, in particular a spur gear-based dampener.

The dampening means are typically arranged to dampen the closing or opening movement of the cartridge seat when assisted by the force generating means so that during dampening the movement has a generally constant speed and/or requires a generally constant additional force so as to reach a constant speed. "Generally constant" typically means within a span of 5 or 10% about an average speed or required force over 90 or 95% of the distance of the movement.

Hence, any violent/uncontrolled opening under the effect of the force generating means can be avoided. In particular any violent/uncontrolled hitting or striking of mechanical parts of the device are inhibited, avoiding early failure of mechanical parts and providing an additional feel of comfort to the user. The movements assisted or caused by the force generation means are controlled by the dampening means.

The force generation means can be arranged to accumulate energy during closure of the cartridge seat and release energy during opening of the cartridge seat for assisting opening thereof, or vice versa.

Typically, the device has a handle movable by a user for driving the cartridge seat from the open to the closed configuration and/or vice-versa. The handle may be used to either close or open the cartridge seat, i.e. in only one direction such as single action handle, or to close and open the cartridge seat, i.e. in both directions such as a double action handle. When the handle operates in only one direction, the force generating means and dampening means are typically configured to take over the return movement of the cartridge seat. When the handle operates in both directions, the force generating means and dampening means can be configured to either assist the return movement of the handle when driven by a user or even to return the handle without need of any assistance by a user. A double action handle may be provided in the form of a pivotable user-seizable lever. A single action handle may be provided in the form of a rotary button seizable by a user.

In one embodiment, the force generation means comprises a spring element. The spring element may be selected from a helicoidal spring, a spiral spring and a spring blade. The spring element may be stressed by the opening or closing movement of the cartridge seat and may be allowed to relax by the opposite movement of the cartridge seat. For instance, the spring element is stressed during closing of the cartridge seat and relaxed during opening of the cartridge seat to assist the opening, or vice-versa. Depending on the spring element and the configuration of the spring element in the device, the spring element may be stressed and relaxed by torsion, compression and extension, and flexion.

In another embodiment, the force generation means comprises a mass system, such as a counter-weight arrangement. For instance, the centre of inertia of a mass is lifted during the closing of the cartridge seat and lowered, under the effect of gravity, during the opening of the cartridge seat to assist the opening, or vice versa. In particular, the handle may be rotatable about and axis and the mass mounted ex-centred to rotate with the handle.

Typically, the cartridge seat has a first cartridge support and a second cartridge support facing the first support, the cartridge supports being driven apart during opening of the cartridge seat and brought together during closing of the cartridge seat. Examples of such cartridge seats are provided in the abovementioned WO 2005/004683, WO 2007/135135 and WO 2007/135136.

At least one cartridge support can be hydraulically displaceable.

At least one cartridge support may be displaceable by movements of the handle via a mechanical drive arrangement. For instance, the mechanical drive arrangement comprises a force transmission lever, in particular a knuckle arrangement, and/or a force transmission gear arrangement, in particular a spur gear arrangement.

The invention also relates to a device for receiving an ingredient cartridge and extracting the ingredient by passing heated liquid through the cartridge, in particular a device as described above. The device comprises: a cartridge seat that has an open configuration for receiving and/or removing a cartridge from such device and a closed configuration for extracting the ingredient; and a user-movable handle for driving the cartridge seat from the open to the closed configuration and vice-versa. The device may include any feature or combination of features disclosed above.

In accordance with the invention, the user-movable handle is associated with an end-of-stroke feed-back means for providing a corresponding feed-back to a user actuating the handle.

This device may incorporate with any of the above described features of the extraction device or any combination of such features.

Typically the feed-back means has a sensitive force feed-back arrangement. The end-of-stroke feed-back means may include an arrangement for generating a mechanical "hard point" with a more or less sudden release on the handle at the end-of-stroke of the handle, the end-of-stroke feed-back means comprising in particular a resilient clip or snap arrangement. A mechanical "hard point" configuration is typically arranged to generate an increased required effort by a user to get passed a particular point, the passing of the point being associated with a relief for the user.

Other force feed-back systems can be implemented to inform the user that he or she is reaching the end of the travelling distance of the handle and comfort him or her that the action has been properly carried out.

As discussed above, the device may include a force generation means for assisting closure or opening of the cartridge seat. The user-movable handle can be associated with a dampening means for dampening motion of the user handle when assisted by the force generating means.

In one embodiment, the force generation means is arranged for assisting opening of the cartridge seat and the end-of-stroke feed-back means is arranged at closure of the cartridge seat, or vice versa.

A further aspect of the invention relates to a device for receiving an ingredient cartridge and extracting the ingredient by passing heated liquid through the cartridge, in particular a device as described above. The device comprises: a cartridge seat that has an open configuration for receiving and/or removing a cartridge from such device and a closed configuration for extracting the ingredient; and a user-movable handle for driving the cartridge seat from the open to the closed configuration and vice-versa. The user-movable handle is associated with a dampening means for dampening motion of the user handle. This device may incorporate with any of the above described features of the various extraction devices or any combination of such features.

Another aspect of the invention relates to a beverage preparation machine, in particular a machine for preparation of tea, coffee or chocolate. The machine comprises a device as described above.

A further aspect of the invention relates to a system that comprises an ingredient cartridge and a beverage machine as mentioned above. The cartridge is held in the cartridge seat of the device of the beverage machine.

Further features and advantages of the invention will appear in the detailed description below.

BRIEF DESCRIPTION OF THE DRAWINGS

The invention will now be described with reference to the schematic drawings, wherein:

FIGS. 1a and 1b disclose, in cross-section, a comparative prior art extraction device;

FIGS. 2a to 2c show cross-sectional views of part of the beverage extraction device according to the invention, the device being in an open configuration;

DETAILED DESCRIPTION

Figure 3B:
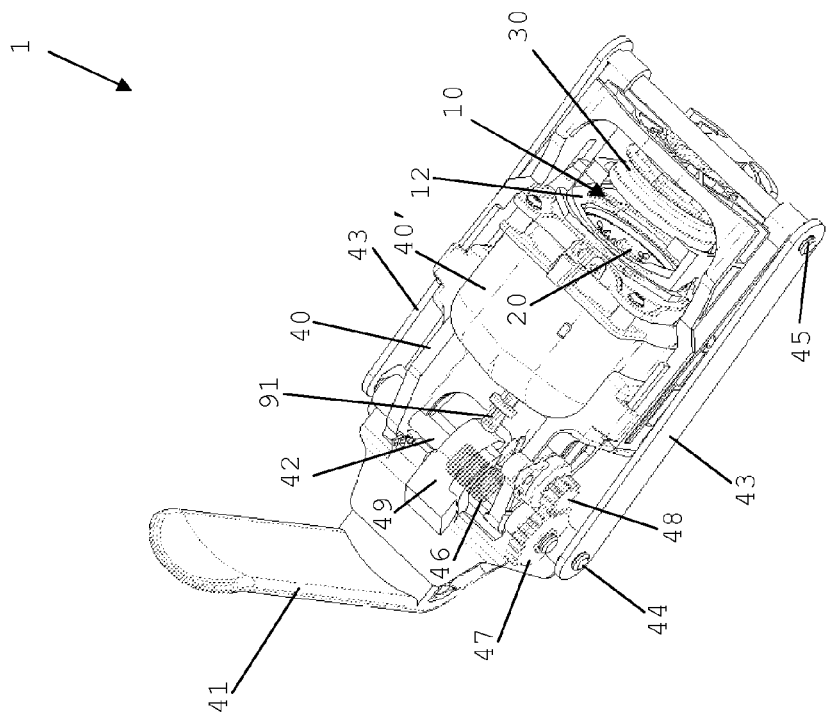
FIGS. 3a and 3b show perspective views of part of the same beverage extraction device in a closed and open configuration, respectively.

FIGS. 1a and 1b illustrate a comparative prior art embodiment of an extraction device 1a. The constructional and operating details of this embodiment are explained in details in WO2007/135136, which is hereby incorporated by way of reference. In particular the here appended FIGS. 1a and 1b correspond, respectively, to FIGS. 7 and 5 of WO'136.

Extraction device 1a of FIGS. 1a and 1b has a manual opening and closing arrangement including a handle 41a and a system 43c,43c',46a,46a' for assisting the return of this arrangement into the open configuration. In FIG. 1a, extraction device 1a is about to be closed with handle 41a approaching the closed horizontal position. In FIG. 1b, extraction device 1a, is fully open with handle 41a generally upright.

Extraction device 1a has a cartridge seat formed of two facing cartridge supports 20a,30a. Cartridge support 30a can be moved generally in translation to and from facing support 20a by pivoting handle 41a about fixed pivoting axis 42a. Pivoting movements of handle 41a are transmitted to movable cartridge support 30a via a movable lever system having a knuckle joint arrangement 43a,43b,44a and a de-multiplication arrangement 43ab interconnected via pivotable member 42a'. Knuckle arrangement has lever 43a pivotally assembled to cartridge support 30 at axis 45a. De-multiplication arrangement is pivotally assembled to handle 41a at axis 42b. Hence, when handle 41a is pivoted, as indicated by arched arrows A1,A2, in particular from the closed position into the upright position, lever 43b' is slightly rotated as well as translated over pivot 44a of knuckle joint arrangement 43a,43b,44a, whereas pivot 44a is lowered in a rotation movement of lever 43b about axis 42a'.

To assist the opening of extraction device 1a, movable lever system 43a,43b,43ab,44a is associated with a helicoidal traction spring 46a. Spring 46a has a pair of hook endings 46a', one of which is shown in FIG. 1a, that can be mounted in corresponding openings or through-holes in facing extensions 43c,43c' of levers 43b,43b', respectively. When mounted on extensions 43c,43c', spring 46a is in a state of expansion in the extraction device's closed configuration (FIG. 1a) and in a state of lesser expansion or release in the device's open configuration (FIG. 1b) as a consequence of the changing distance between extensions 43c and 43c' in the opened and closed configurations. Hence, spring 46a will assist the opening of extraction device 1a, facilitating the opening movement, and be stressed during the closing of device 1a.

The invention will now described with reference to the particular embodiment, according to the invention, illustrated in FIGS. 2a to 4.

FIGS. 2a to 4 show an extraction device 1 according to the invention. Device 1 can be part of a machine for preparing beverages by circulating heated liquid, such as water, through an ingredient cartridge 2 in the form of a soft pod, e.g. made of a sealed and air-tight aluminium envelope containing the beverage ingredient e.g. ground coffee, as for example commercialised by NESPRESSO™.

Extraction device 1 has a cartridge seat 10 comprising a first cartridge support 20 and a second cartridge support 30 facing first cartridge support 20. Cartridge supports 20,30 are arranged to receive cartridge 2 in an open spaced apart configuration and to enclose cartridge 2 in a closed urged together extraction configuration. FIGS. 2a, 2b, 2c and 3b illustrate cartridge seat 10 with cartridge supports 20,30 in their open spaced apart configuration. FIGS. 3a and 4 show cartridge seat 10 with cartridge supports 20,30 in their closed urged together extraction configuration in which cartridge 2 is enclosed in seat 10.

FIG. 2a illustrates the insertion by gravity of cartridge 2 from above into cartridge seat 10. More specifically cartridge 2 is shown above a cartridge inlet channel 11 that leads to seat 10 underneath.

In FIG. 2b, cartridge 2 is shown held in cartridge seat 10 in an open position prior to extraction. Cartridge seat 10 is associated with cartridge retaining members 12 for holding cartridge 2 in seat 10 while support members 20,30 are in their spaced apart open position. More specifically, retaining members 12 are arranged at the periphery of seat 10 so that rim 3 of cartridge 2 rests on and against members 12 in this intermediate cartridge loading position. When support members 20,30 are urged together, cartridge 2 with rim 3 is pushed by support member 30 through peripheral member 12 against facing member 20 into the cartridge extraction position, in which cartridge 2 is enclosed in-between support members 20,30 (as shown in FIG. 4).

In FIG. 2c, cartridge seat 10 is shown in its reopened position upon extraction with support members 20,30 in their spaced apart configuration. Device 1 is arranged to evacuate used cartridge 2 by gravity from seat 10 via a lower evacuation passage 13. Cartridge 2 may be collected in a cartridge collector (not shown), e.g. a cartridge receptacle, located underneath seat 10.

The general principle of the extraction device with the retaining members concerning the insertion, intermediate positioning, enclosing and evacuation of cartridge 2, is disclosed in greater details in EP 1 859 714, in particular for soft or flexible cartridges, e.g. pods, as well as in EP 1 646 305, in particular for rigid cartridges, e.g. capsules. These publications are hereby incorporated by way of reference.

In FIGS. 3a and 4 support members 20,30 are shown urged together enclosing cartridge 2 in seat 10.

As shown in greater details in FIG. 4, cartridge support 20 has a tubular piston 21 movable in a piston chamber 25. Piston chamber 25 is delimited by an outer generally cup-shaped front part 26 holding the front part of capsule support member 20 and by a generally tubular rear part 27 inside and along which piston 21 is movable.

Moreover, extraction device 1 is associated with a liquid injection arrangement that includes: a source of liquid, such as cold water in particular stored in a reservoir 60a, a pump 60 for pumping liquid from reservoir 60a via a pipe 61 and chamber inlet 28 under pressure into piston chamber 25 and then still under pressure via chamber outlet 29 into inline heater 70 via tube 71 and then, from heater 70 via check valve 80, tube 81 into piston tube 21 forming a heated liquid inlet of cartridge seat 10.

In cartridge seat 10, the pressurised and heated liquid flows through cartridge 2 to form a beverage by extraction of the ingredient contained in cartridge 2, the beverage being collected and dispensed via outlet 35 associated with cartridge support 30, for example into a user cup or mug located thereunder.

For the sake of clarity, the liquid flow path through extraction device 1 is schematically indicated by the thick arrows in FIG. 4.

Hence, this liquid injection arrangement is connected to the piston chamber 25 for injecting unheated pressurised liquid into chamber 25 and driving hydraulically cartridge support 20 with piston 21 against facing cartridge support 30 into the closed position. Seals 22,23, e.g. o-ring seals, between cartridge support 20,21 and front and rear parts 26,26 prevent leakage from chamber 25. Upon circulation through piston chamber 25, the liquid is further circulated continuously under pressure from piston chamber 25, through heater 70 into cartridge chamber 10, in accordance with the invention.

Moreover, cartridge support 30 is movable towards and away from facing cartridge support 20 by a mechanical drive arrangement.

Figure 3A:
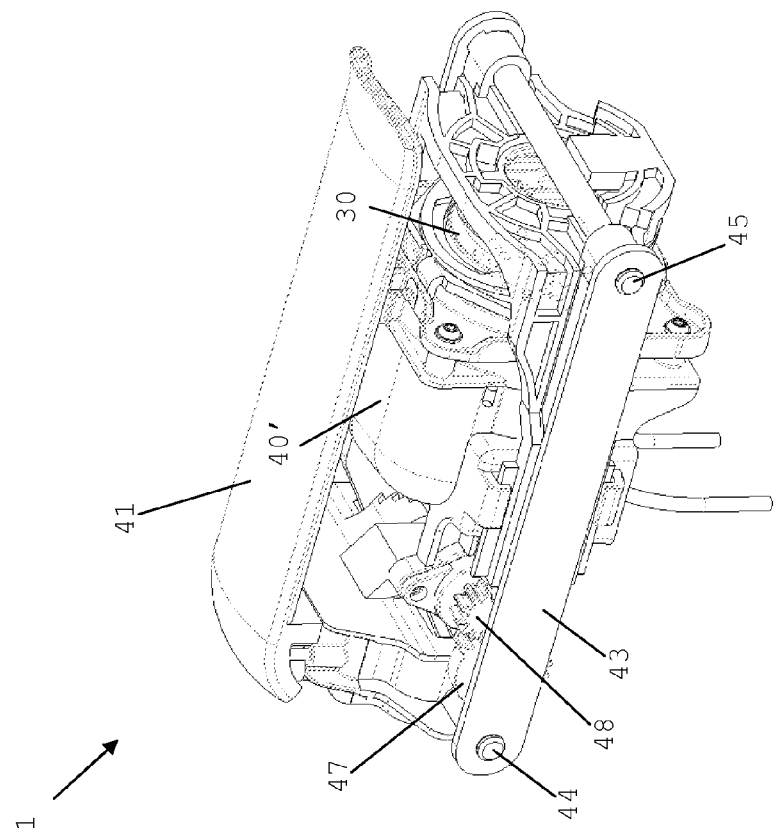
Figure 4:
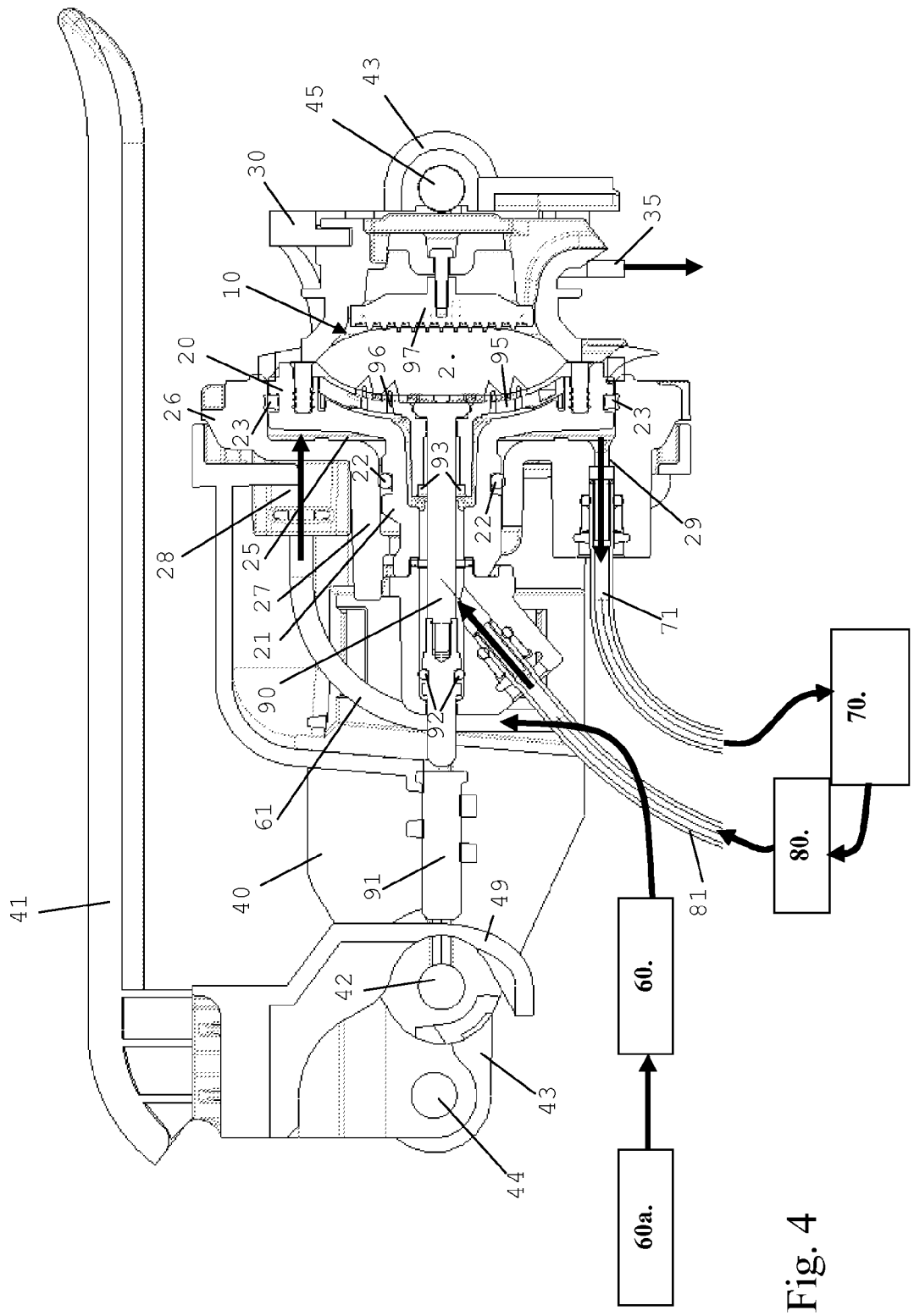
FIG. 4 shows a cross-sectional and partly schematic view of the beverage extraction device of FIGS. 2a to 3b in the closed configuration.

As shown in greater details in FIGS. 3a and 3b, the mechanical drive arrangement comprises a hand-drivable generally L-shaped handle 41 pivotally mounted on a fixed frame 40 via an axis 42 of handle 41. A pair of cranks 43 are at one extremity connected via rod 44 and rotatably mounted on handle 41 at a distance from axis 42 and at their other extremity 45 pivotally mounted to cartridge support 30, so that when generally L-shaped handle 41 is pushed from the open position (FIG. 3b) into the closed position (FIG. 3a), cranks 43 are driven by handle 41 pivoting about axis 42 to pull cartridge support 30 towards cartridge support 20. Various mechanical drive arrangements, manually actuated and/or motorised, may be used to implement this subsidiary aspect of the invention, for instance as disclosed in EP 1 646 305, EP 1 859 713, EP 1 767 129 and WO 2009/043630, which are hereby incorporated by reference. In particular, the mechanical drive arrangement may have a series of connection elements forming a knuckle joint arrangement and a de-multiplication arrangement operating along the generally principle illustrated in FIGS. 1a and 1b.

Frame 40 also bears a housing panel 40' for shielding tube 61, inlet connection 28 and front and rear parts 26,27 delimiting piston chamber 25. Front and rear parts 26,27 are also fixed to frame 40. Hence, tubes 61,71 can be mounted between fixed elements 26,60,70,80 and may be made of rigid materials that can be easily handled in an automatic manufacturing process of the extraction device.

Furthermore, to facilitate reopening of handle 41, a spring element 46, as shown in FIG. 3b, is provided. Spring element 46 is stressed during the closing movement and drives handle 41 back automatically in the opening movement or at least assists such an opening movement. In particular, helicoidal spring 46 has one end 46' secured to frame 40 and another end secured to axis 42 or resting against handle 41 in the vicinity of axis 42. Helicoidal spring 46 is mounted around axis 42. Different spring arrangements may of course be provided to produce this or a similar effect. The spring arrangement may for example be connected to different elements of the articulated chain of elements that links cartridge support 30 to handle 41. The spring may be mounted to work in traction, as illustrated in FIGS. 1a and 1b, in compression or in torsion. Furthermore, a spring can also be in the shape of a blade, that is mounted to work in flexion between frame 40 and handle 41.

It is of course possible to mount the spring in the opposite direction, i.e. to assist the closure movement of the extraction device.

Moreover, in accordance with the invention, to provide an ergonomic feel of control of the mechanical drive arrangement during the opening and closing movement via handle 41, in order to improve the comfort for the user when actuating handle 41 and avoid an end-of-stroke striking of handle 41 when driven by spring 46, a movement dampener is provided. In this particular embodiment, the dampener is provided in the form of spur gears that follow the rotation of axis 42. Hence, a first toothed wheel 47 is assembled to axis 42 that fixed to handle 41. A second toothed wheel 48 cooperating with first wheel 42 is rotatably mounted on frame 40 to dampen the rotation of axis 42. The inertia and friction related to the movement of the spur gears controls the opening movement and acts as a dampener. Different dampening systems are of course suitable to control the opening and/or closing of such an extraction device, in particular dampeners selected from friction dampeners, hydraulic dampeners, air dampeners, magnetic dampeners, etc. . . .

Extraction device 1 is also provided with a cartridge ejector 90 for ejecting cartridge 2 at reopening upon extraction so as to assist evacuation of cartridge 2. Ejector rod 90 is movable within tubular piston 21 and actuated via cam 49 and cam-follower 91 by the movement of handle 41 to which cam 49 is connected. In FIG. 4, ejector 90 is shown in its retracted position whereas in FIG. 2b, ejector 90 is shown in its deployed position to eject cartridge 2 from cartridge support 20.

Also shown in FIG. 4, cartridge support 20 is fitted with a sprinkler 95 for injecting heated liquid into cartridge 2 via hollow needles 96 for piercing cartridge 2. During use, heated liquid is delivered under pressure from tube 81 into tubular piston 21 around to circulate around ejector 91 along sprinkler 95 and into cartridge 2 via needles 96. Seals 92,93, e.g. o-ring seals, are provided to prevent leakage along ejector 90 of the injected water. Facing cartridge support 30 bears an opening arrangement 97, e.g. in the form of a plate with tearing elements such as a pyramid plate. Hence, heated fluid injected into cartridge 2 via needles 96 extract the ingredient contained in the cartridge and leaves cartridge 2 at opening arrangement 97 from where it is circulated to dispensing outlet 35. A cup or mug can then be used to collect the beverage dispensed at outlet 35 that is connected to cartridge support 30. Upon extraction, ejector 90 is particularly helpful to detach cartridge 2 from needles 96.

Upon introducing a cartridge 2 into open seat 10 (FIG. 2b), the user moves down handle 41, whereby the front part of extraction device 1, i.e. cartridge support 30, is driven in translation by crank 43 and lever mechanism placed on both side of extraction device 1. Thereby, cartridge 2 is forced beyond retaining members 12 by bending peripheral flanges 3 of cartridge 2. Once the mechanical closing movement via handle 41 is over, cartridge 2 is caught between pyramid plate 97 and sprinkler 95, pierced by needles 96. At this stage, a near sealing of cartridge seat 10 around cartridge 2 is achieved. In this almost closed configuration, cartridge supports 20,30 are typically spaced apart by less than 2.5 mm usually less than 1.5 mm, such as less than 0.5 mm.

In a variation, it is also possible to configure the closing distance such that piercing of the cartridge occurs under the effect of the hydraulic closure of the cartridge seat instead of under the mechanical closure. This offers the advantage that the user does not have to provide the increased closure force for piercing the cartridge. This closure force is then provided by the pump.

Once pump 60 is activated to prepare a beverage, unheated liquid, e.g. cold water, is sent to piston chamber 25. Then the liquid leaves piston chamber 25 and flows through heating element 70 and thereafter until valve 80. When the pressure in the fluid starts to increase in front of valve 80, cartridge support 20 with piston 21 is translated and urged under the increasing pressure of the liquid in piston chamber 25 against facing cartridge support 30 to properly seal cartridge 2 within cartridge seat 10. Opening of valve 80 occurs at a pressure level sufficient to avoid any leakage between capsule supports 20,30, as illustrated in FIG. 4.

When valve 80 opens to allow the passage of the fluid, pressurized heated liquid flows to sprinkler 95 and into cartridge 2 via needles 96, whereby the pressure increases in cartridge 2 until the cartridge is torn open on pyramid plate 97 to allow the liquid to flow out of cartridge 2 during extraction.

In this context, "heated liquid" means liquid that has been directly heated by the heater of the extraction device. "Unheated liquid" means liquid that has in particular not as yet exited the piston chamber and passed through the heater. Thus, the designation of "unheated liquid" includes the liquid from the source of liquid, e.g. a tank, upstream the piston chamber and inside the piston chamber and generally upstream the heater.

At the end of the brewing process, valve 80 can be deactivated so as to release the pressure in piston chamber 25. Hence, cartridge supports 20,30 are unsealed and allowed to separate. Typically, valve 80, which may be a solenoid valve, is deactivated with the deactivation of pump 60.

To evacuate capsule 2 upon use, the user releases handle 41 which opens automatically under the effect of spring 46 at a controlled speed under the effect of dampener 47,48.

Thereby, the front part of extraction device 1, i.e. cartridge support 30, is driven away from the rear part of extraction device 1, i.e. cartridge support 20. This leads to further opening cartridge seat 10 while ejector is deployed under the effect of cam 49 and cam follower 91 to push cartridge 2 away from cartridge support 20 and allow it to fall under the effect of gravity from cartridge seat 10 (FIG. 2*c*), e.g. into a used capsule collector (not shown) located thereunder.

Figure 5C:
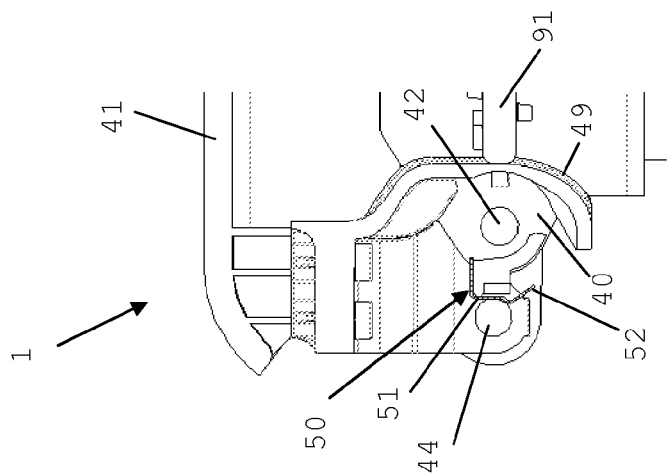
FIGS. 5a to 5c illustrate, in cross-section, part of this device with an end-of-stroke feed-back arrangement, according to the invention.
Figure 5B:
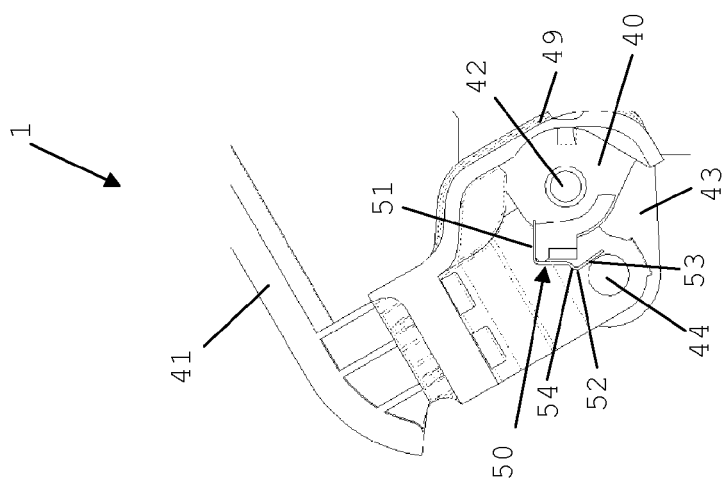
Figure 5A:
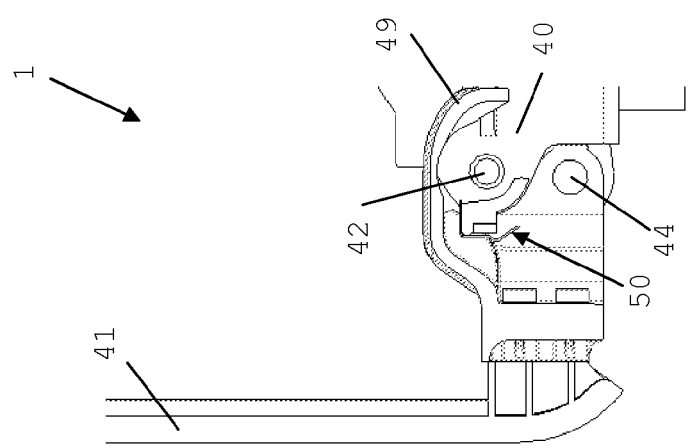

FIGS. 5*a* to 5*c* illustrate a further ergonomic aspect of extraction device 1. Device 1 is so arranged that when handle 41 is about to reach the horizontal position, a feeling of locking is given to users so as to provide the user an ergonomic feed-back of the end of the movement. FIG. 5*a* illustrate handle 41 in the upright open position. FIG. 5*b* show handle 41 in an intermediate position during the closing movement. FIG. 5*c* illustrate handle 41 in the closed position.

In accordance with the invention, handle 41 is associated with an end-of-stroke feed-back means 50. Feed-back means 50 is arranged to provide a feed-back to a user actuating handle 41 to indicate when handle reaches the end of the traveling from the opened to the closed position so that a user knows when the closing movement is properly carried out.

In the embodiment illustrated in FIGS. 5*a* to 5*c*, end-of-movement feed-back means 50 includes an arrangement for providing a force feedback to a user via handle 41, in particular an arrangement for generating a mechanical "hard point" with a sudden release on the handle at the end-of-stroke of the handle. For generating such a force feed back, means 50 includes a resilient clip or snap arrangement. In particular means 50 can be formed of a spring blade that has a fixed end 51, i.e. a generally L-shaped base 51, secured to or against frame 40 and a free end 52 that is resiliently deformable. The generally L-shaped free end 52 has a resistance ramp 53 joining a release ramp 54. When handle 41 is pushed down, i.e. from its position illustrated in FIG. 5*a* to its position shown in FIG. 5*c*, rod 44 is pivoted around axis 42. When handle 41 approaches its horizontal closing position, as shown in FIG. 5*b*, rod 44 comes into contact with resistance ramp 53. As it is pivoting around axis 42, rod 44 slides along resistance ramp 53, pushing ramp 42 towards axis 42 whereby free end 52 is resiliently deformed which generates a force on rod 44 and against the clock-wise rotation of rod 44 around axis 42, which force grows as rod 44 is further rotated. When rod 44 is generally about the junction between resistance ramp 53 and release ramp 54, and taking into account the force created by spring 46, rod 44 reaches a state of equilibrium. Passed that point of equilibrium, rod 44 passes along release ramp 53 that generates a force on handle 41 in its closing direction. In other words, during the passage of rod 44 over spring blade 50, the effort needed to move handle 41 into its horizontal closed position progressively increases before being incrementally reduced. This feels like a "hard point" to pass for the user actuating handle 41. This "hard point" at the end-of-stroke of handle 41 thus provides a mechanical sensitive feedback indicating to the user that the movement of handle 41 is properly completed.

Alternatively or cumulatively, it is also possible to provide an end-of-stroke feed-back means to indicate to a user when the handle reaches the end of the traveling from the closed to the opened position.

It is of course possible to provide other sensitive feed-back means, than a feed-back force on handle 41. For example, the feed-back means may be arranged as a visual or sound feed-back system to the user.

The invention claimed is:

1. A device for receiving an ingredient cartridge and extracting the ingredient by passing heated liquid through the cartridge, the device comprising:
    a cartridge seat that has an open configuration for receiving and/or removing a cartridge from such device and a closed configuration for extracting the ingredient;
    a user-movable handle for moving the cartridge seat from the open to the closed configuration and vice-versa, the user-movable handle mounted on a fixed frame via an axis of the user-movable handle; and
    the user-movable handle is associated with an end-of-stroke feed-back member for providing a corresponding feed-back to a user actuating the handle, the feed-back member comprises a spring blade comprising an L-shaped base with a resistance ramp and a release ramp, the spring blade further comprising a fixed end secured to the fixed frame, and a free end that is resiliently deformable.

2. The device of claim 1, further comprising a force generation member for assisting closure or opening of the cartridge seat via the handle.

3. The device of claim 2, wherein the force generation member is designed for assisting opening of the cartridge seat and the end-of-stroke feed-back is arranged at a closure of the cartridge seat, or vice versa.

4. The device of claim 1, wherein the end-of-stroke feed-back member comprising a resilient clip or snap arrangement.

5. The device of claim 1, wherein the user-movable handle is associated with a dampening member for dampening motion of the user handle when assisted by the force generating member.

* * * * *